(No Model.) 2 Sheets—Sheet 1.
C. O. FARCIOT.
AUTOMATIC RECORDING COMPASS.
No. 413,250. Patented Oct. 22, 1889.
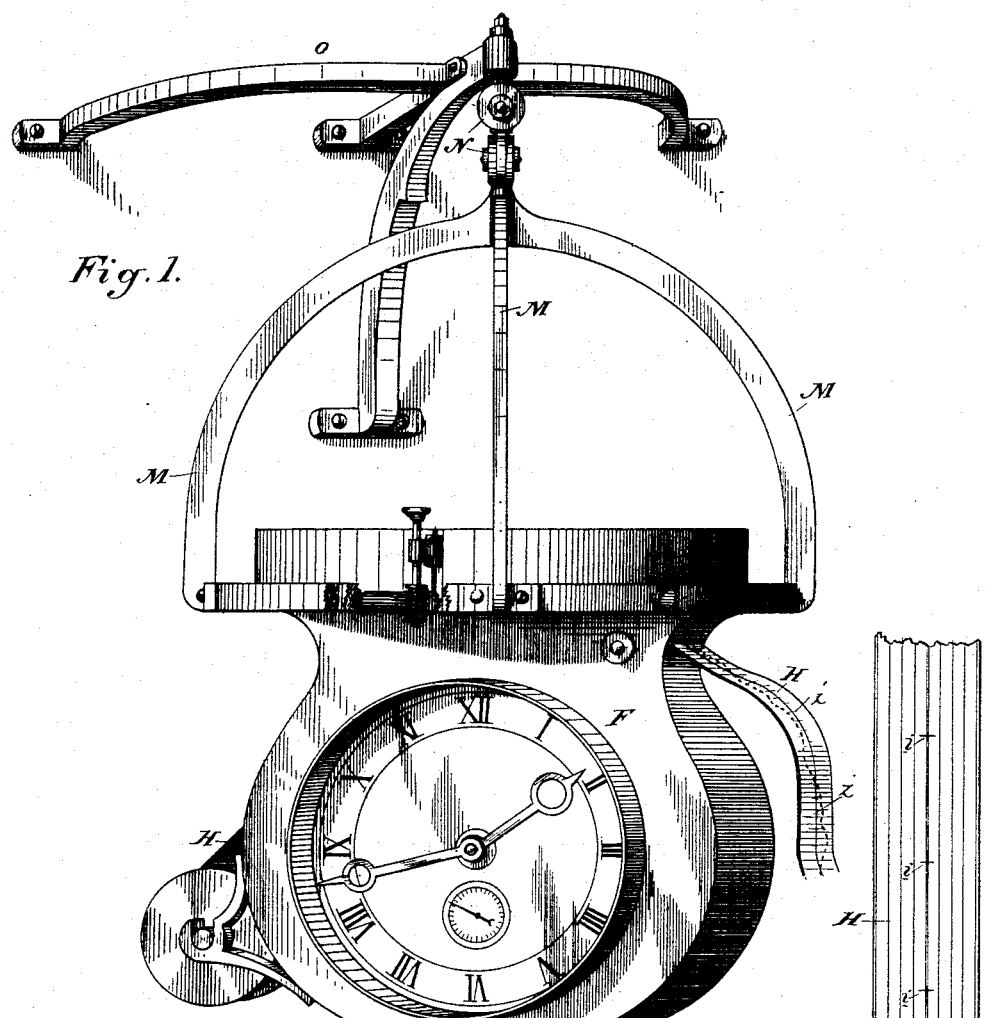
Fig. 1.
Fig. 3.
Fig. 4.
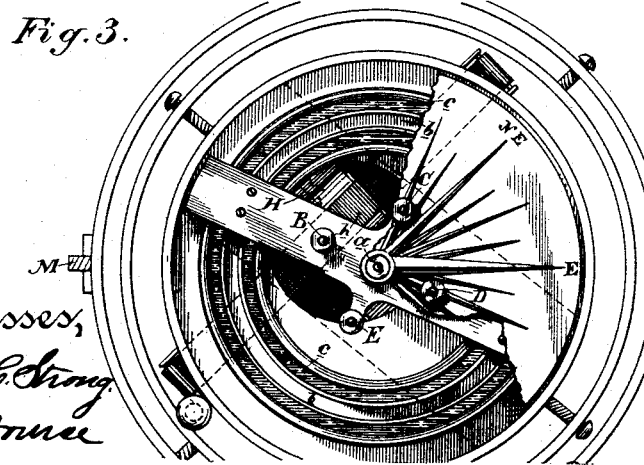
Witnesses,
Geo. H. Strong
Inventor,
C. O. Farciot
By Dewey & Co.
Attys

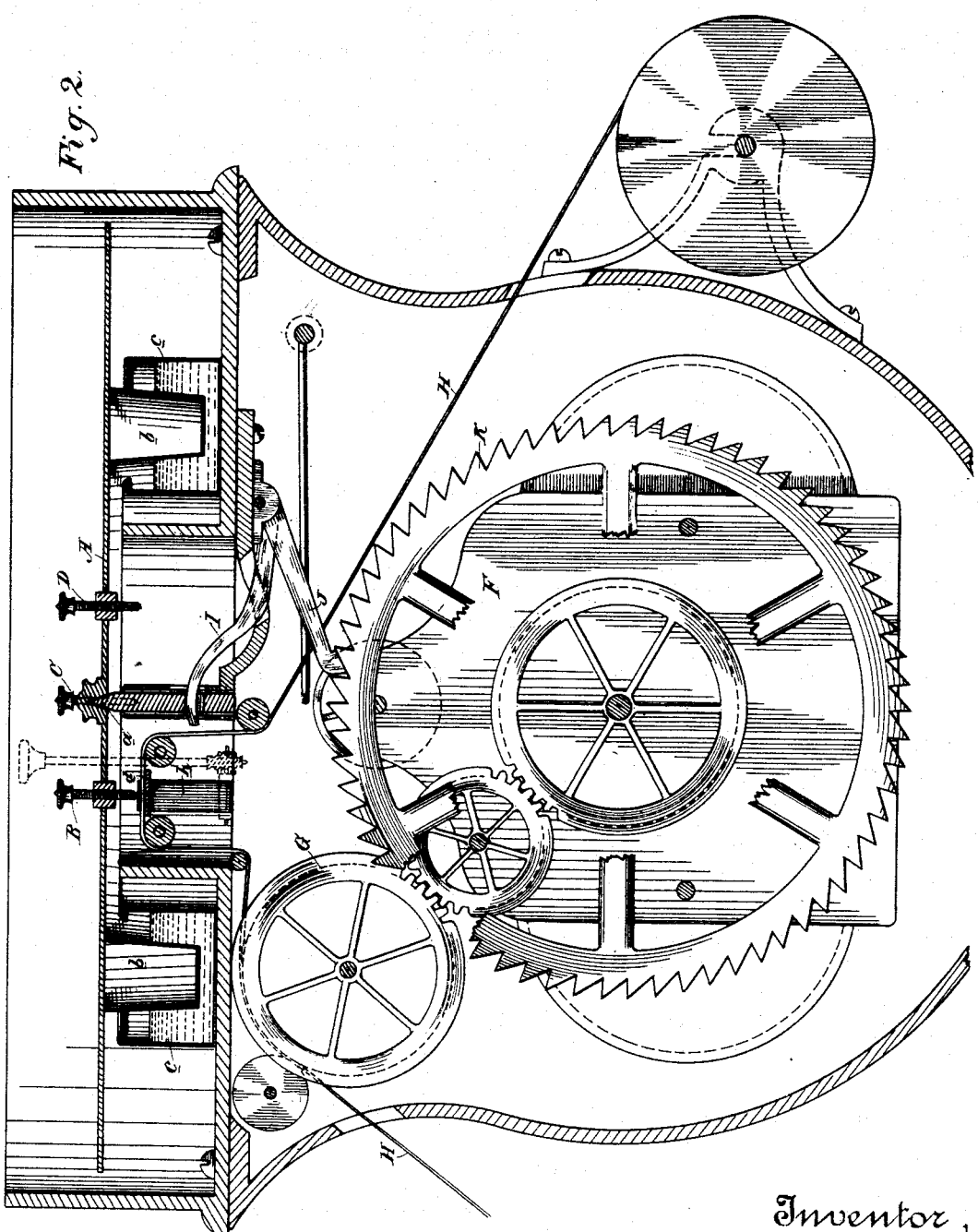

UNITED STATES PATENT OFFICE.

CHARLES O. FARCIOT, OF SAN FRANCISCO, CALIFORNIA, ASSIGNOR OF TWO-THIRDS TO NATHAN W. SPAULDING AND CHARLES GOODALL, OF SAME PLACE.

AUTOMATIC RECORDING-COMPASS.

SPECIFICATION forming part of Letters Patent No. 413,250, dated October 22, 1889.

Application filed September 22, 1886. Serial No. 214,269. (No model.)

*To all whom it may concern:*

Be it known that I, CHARLES O. FARCIOT, of the city and county of San Francisco, State of California, have invented an Improvement in Automatic Registering-Compasses; and I hereby declare the following to be a full, clear, and exact description of the same.

My invention relates to certain improvements in mariners' compasses; and it consists of an attachment whereby the course of the vessel may be automatically registered, so that upon inspection at any time the course which has been steered at any given hour or time may be known.

Referring to the accompanying drawings for a more complete explanation of my invention, Figure 1 is a view of a compass with my attachment and suspending device. Fig. 2 is a vertical section taken through the center. Fig. 3 is a plan view with part of the card broken away. Fig. 4 shows a portion of my traveling band or tape, showing the float and mechanism beneath.

Considerable difficulty is often experienced from the erratic steering of vessels when in charge of inexperienced or careless men, so that the vessel may often be found to be a considerable distance from her true course, and when approaching dangerous shores it is often the cause of great disaster. In order to provide a means for indicating at all times the course upon which a vessel has been steered and provide a permanent memorandum for future use, I employ a traveling band or tape, which may be moved by clock-work at a fixed rate, and in connection therewith indicating-points or markers so connected with the compass-needle that the course will be instantly shown by inspecting the strip or surface upon which the marks have been made.

I will first illustrate my invention as follows:

A is the needle of a compass, suspended upon the pivot pin or point $a$ within a bowl, which is supported by gimbals in the usual manner, and the weight of the needle and its attachments may be further relieved by an annular float $b$, which is supported in an annular trough $c$, containing liquid. This float serves to steady the needle and to prevent oscillation, while allowing it freedom of motion about the pivot-pin. Upon this needle I fix four marking points or pencils B, C, D, and E so that they project downward at equal distances away from the central pivot of the needle, and preferably between the center and the circular float. Beneath the compass-bowl, and fixed to it so as to be suspended with it and partake of its movements caused by the rolling and pitching of the vessel, is a clock F, which is sufficiently accurate to indicate the time. This mechanism also serves to drive a drum or roller G, over which passes a strip of paper or other material H, upon which an impression or mark may be made, this paper being driven at a regular rate of speed by the clock mechanism. The highest point of the table $d$, over which it passes, is fixed to stand beneath one side of a circle which would pass through the point of the indicating-markers if this circle were struck from the pivot-pin $a$. This table is preferably placed as high as possible within the float-chamber and beneath the working-points which depend from the needle, so that these points may be made very short, and will therefore not be moved appreciably out of line by the rolling and pitching of the vessel. The four marking-points corresponding with the four points of the compass are differently formed, so that their marks upon the paper may be readily understood at a glance, one making a dot, another two dots, a third a short line, and the fourth a small circle; or other characters may be used. In order to make a mark when either of these points is dropped upon the paper strip, I employ an inked ribbon $h$, which passes across the table above the paper strip, and when a point falls upon it an impression will be made upon the paper strip beneath. In connection with this mechanism is a lever I, upon which the lower end of the pivot-pin $a$ of the compass-needle is supported. This lever is connected with a pawl J, the end of which engages a ratchet-wheel K, which is operated by the clock-work, moving so as to raise the pawl, the lever, the pivot-pin, and needle with the marking-points at regular intervals of time. When the lever is raised, the pivot-pin will be raised high enough so that the needle will be suspended by it and free to move and take its proper direction. When this lever is released by the movement of the clock, it allows the pivot-pin to sink or drop, and with it the needle carrying the marking-points. The point which is at that time over the line of the paper will fall upon it when the pivot-pin is released and will make a mark upon the paper. It will be manifest that the position of this mark will depend upon the position of the vessel with reference to the compass-needle, and as long as the vessel is kept upon a certain course these marks will be made at regular intervals upon the paper and in a regular line as the paper passes beneath the point. The strip of paper may have its surface divided by eight parallel longitudinal lines, so that each division represents a point of the compass, the eight divisions showing four points upon each side of either of the cardinal points—as north, east, south, or west—and as long as the vessel is kept within four points of either of these the mark representing that course will be indicated upon the strip. If the vessel changes her course more than four points upon either side, it will carry the marker or indicator for that course off the edge of the strip, and will bring the next in order upon the paper.

If the direction of the vessel be so considerably changed as to bring one of the other points above the tape and ink-ribbon, it will be manifest that that point would in like manner make a series of marks upon the paper as long as the course continued to be the same, and so on for each of the other marking-points. In order to show the course the vessel may have been on at any particular time, these points are preferably made, as before described, of different forms, so that one mark may represent the northing of the vessel, and another mark may represent the easterly course, another the southing, and another one the course to the west. By this construction either one or the other of the marks will be imprinted upon the passing strip, and if there should be any irregularity in the course it would be indicated by the marks passing more or less diagonally to one side or the other of the paper; or if the course be very considerably changed the mark of one of the points would pass entirely off the paper and another one would then commence upon the opposite side. By means of transverse lines $i$ across the paper the latter may be divided to represent certain intervals of time, so that the exact time of any variation or change of course may be known. These lines are made at certain regular intervals, so that the tape may travel the distance between any two in a known time, as ten minutes. The course of a river, inlet, or any tortuous channel would be thus accurately recorded and measured by timing the speed of the vessel, and the minute at which changes of direction occurred during a voyage would always be recorded.

In order to prevent irregular action on account of heavy seas which may strike the vessel, and which would by the sudden jar cause the compass to momentarily vary, I employ suspending-arms M, to which the compass and gimbals are attached. These arms converge and unite at a central point above the compass, having joints or hinges at right angles with each other, as shown at N, which thus allow the apparatus to swing easily and independently of the movement of the gimbals. The whole is suspended from a bracket O, which is attached at any convenient point. By means of the transversely-placed hinge-joints N the compass can be set on a line with the keel of the vessel. Other devices or well-known mechanical equivalents may be employed to produce a similar result, which will not differ materially in operation from those herein described.

I am aware that it is old to employ a marking-point with a needle, and also to use a traveling strip adapted to receive at regular intervals marks from said point, and I therefore claim neither of these devices broadly, nor the combination of the two.

Having thus described my invention, what I claim as new, and desire to secure by Letters Patent, is—

1. In combination, a compass having a pivoted or suspended magnetic needle, indicating or marking points or pencils arranged at different places upon said needle and at approximately equal distances from the pivot, each of said points being adapted to make a distinctive mark, and a surface upon which the said indicating-points may inscribe their marks, whereby the course of the vessel with any variations thereof, and also all complete changes of course, will be automatically indicated by the different marking-points being brought into action and making different marks upon said surface.

2. A compass having a centrally suspended or pivoted magnetic needle, with a series of indicating or marking points fixed to it in a circle around the central pivot, each of said points being adapted to make a distinctive mark, a surface or tablet beneath the needle, and a clock work or mechanism by which said surface is moved at a uniform rate of speed, in combination with a lever or equivalent mechanism connected with the clock, whereby the needle with its marking-points and the indicating-surface may be made to approach each other at regular intervals, substantially as herein described.

3. In combination, a centrally-suspended magnetic needle having marking-points arranged about its center corresponding to the various points of the compass, each of said marking-points being adapted to make a distinctive mark, and a strip with which the marking-points may be separately brought into contact, said strip being divided by transverse lines and moved at a uniform rate, whereby the times at which the vessel changed its course or deviated from its mean course may be automatically recorded.

4. In combination, a pivoted magnetic needle having marking-points depending therefrom, a receiving-surface arranged below the needle, said points being adapted to mark upon said surface, an annular float depending from the said needle, and an annular chamber containing liquid, all substantially as described.

5. In combination, a magnetic needle having marking-points B C D E having distinctive characters, said points being held rigidly to the needle and depending therefrom, a surface adapted to receive the marks from said points, a central pivot-pin for the needle, the whole structure—viz., needle, pivot-pin, and depending points—being adapted to have vertical movement, a lever or arm engaging with the pivot-pin, and an arm connected with said lever and actuated by clock-work, whereby at regular intervals the pivot-pin and needle will be raised, lifting the depending point from the receiving-surface, so that the needle will be free to turn and drop by gravity at regular intervals.

6. In combination, a magnetic needle supported upon a central pivot-pin, marking-points having distinct characters arranged at different points in a circle about the needle-center, and a marking-surface placed tangential to the path of the marking-points, whereby the said points separately engage with the marking-surface, substantially as described.

7. A pivoted magnetic needle having marking-points depending therefrom, an annular float fixed beneath the needle, and a corresponding chamber containing liquid in which the float rests, in combination with a table supported within the inner circumference of the liquid-containing chamber and above the plane of its bottom and a traveling tape or receiving-surface upon the top of said table in a vertical line beneath one side of the circle in which the marking-points are arranged, substantially as herein described.

8. A pivoted magnetic needle having marking-points projecting downward at intervals in a circle around the pivot, an annular float fixed beneath the needle in a circle of larger diameter than that of the markers, and a similarly-shaped annular liquid-containing chamber within which the float dips, in combination with a receiving-surface and table and a lever by which the pivot-pin and needle are alternately elevated and depressed, all arranged within the inner circumference of the annular chamber, substantially as herein described.

9. A pivoted magnetic needle having marking-points projecting downward from it in a circle around its pivot, an annular float, and chamber with a table to support a receiving-surface beneath one side of the circle of the marking-points, as shown, in combination with a traveling receiving-surface moving across the table and an ink or printing ribbon passing across the table transversely to the receiving-surface.

10. A compass-needle fulcrumed upon a pivot and float within a bowl having gimbals, as shown, in combination with arms extending upward from the supporting-frame and the hinged suspending-joints N, substantially as herein described.

In witness whereof I have hereunto set my hand.

CHARLES O. FARCIOT.

Witnesses:
S. H. NOURSE,
JAMES MASON.